Patented Mar. 25, 1952

2,590,647

UNITED STATES PATENT OFFICE 2,590,647

SOYBEAN POWDER BASES AND PRODUCTS

Elmer K. Pettibone, San Francisco, Calif.

No Drawing. Application November 25, 1949,
Serial No. 129,504

17 Claims. (Cl. 99—2)

(Granted under the act of March 3, 1883, as
amended April 30, 1928; 370 O. G. 757)

The invention described herein, if patented, may be manufactured and used by or for the Government for governmental purposes without the payment to me of any royalty thereon.

This invention relates to soybean powder base foodstuffs with improved nutritive and flavor values. More particularly, the invention relates to cold or hot mixing powder bases and products formed therewith containing soybean flour or granulated soybeans as a basic constituent with the characteristic soya flavor altered, changed or modified by processing with hydrolysates of vegetable protein and admixtures of cocoa therewith.

The value of soybeans as a foodstuff or admixture in foodstuffs has long been known. However, in a practical use heretofore, univeral adaptation and application has failed to materialize and only very small proportionate use has developed. This failure is believed to be due to the inherently disagreeable or bitter flavor of the soya which has been attempted to be overcome by processing the soya, as in toasting or otherwise by the addition of condiment flavoring agents. The addition of such flavoring agents have been attempts to camouflage the inherently bitter flavor of soya and they do so only when present in excessive or in over proportional amounts compared to relatively minute quantities of soya. In any case wherein high percentages of soya is present in the soya foodstuffs heretofore known, the characteristic soya flavor has not been satisfactorily eliminated and thus prevented general acceptance of the soybean as a primary constituent of a foodstuff or for use as the basic solids ingredient of a prepared food mix.

It is therefore an object of this invention to provide an improved soybean food mix.

It is another object of this invention to provide an economical and improved prepared soybean powder base ready for cold or hot mixing with liquids to form foodstuffs of high nutritive content and pleasing taste.

An additional object of this invention is to provide improved ready to mix foodstuffs containing a powder base formed from soybeans having the characteristic soya flavor altered, changed or modified by hydrolysates of vegetable protein.

A further object of this invention is to provide a ready to mix chocolate soybean powder base and the products derived therefrom.

Additional objects, advantages, mixtures and uses will be apparent from the following description, illustrations and specific examples.

The preferred general process for obtaining a treated or modified soybean flour or the like is to mix with the whole soybeans, or particles thereof such as cracked soybeans or soybean grits, an aqueous solution of hydrolyzed vegetable protein in the nature of commercial preparations from wheat, corn, soybeans, or sugar beet by-product or the like; then, to obtain the mixture of soybeans and vegetable protein hydrolysates in the form of a flour, the preparation is milled or ground by conventional apparatus.

Depending on the percentage of aqueous solution of vegetable protein hydrolysates used, and the percentage of moisture in this aqueous solution of vegetable protein hydrolysates, the milling or grinding alone may produce a sufficiently dry flour to minimize or eliminate artificial drying by heat; or when a comparatively large percentage of the aqueous solution of vegetable protein hydrolysates is used, the milling or grinding will produce a flour sufficiently dry to minimize or eliminate artificial drying provided the percentage of moisture in the solution of vegetable protein hydrolysates is reduced by concentration, preferably in vacuum, prior to mixing with the soybeans or soybean particles, and prior to mixing and grinding.

The milling or grinding may be to obtain desired granulation sizes including ordinary flour, or cake flour, as desired. As the soybeans are broken down, the freshly broken surfaces are somewhat porous and there is a penetration into and either a permanent close adherence of a hydrolyzed proteins to the soybean particles or a chemical change in its flavor characteristic. The mechanical action of the milling or grinding has a tendency to obtain a thorough mixing, and distribution of the hydrolyzed proteins throughout the mixture even with as fine a granulation as a flour.

The increased surface of the soybean particles resulting from milling or grinding tends toward evaporation of the moisture in the protein hydrolysates, and this, plus the heat generated by milling or grinding, reduces undesired moisture in the finished product.

When the percentage of water in the solution of vegetable protein hydrolysates has been properly adjusted, by concentration if necessary, prior to mixing with the soybeans, the milling or grinding produces a mix which may be as fluffy and flowing as an ordinary flour; or may be a fluffy and friable granular mixture, requiring artificial drying by heat only when a relatively high percentage of moisture exists in the mixture after compounding. Such excessive moisture may be due to failure to adjust concentration of the solution containing vegetable protein hydrolysates prior to mixing with the soybeans.

The foregoing does not mean that concentration is carried to such lengths as to reduce the vegetable protein hydrolysates to a dry crystalline, or powdery form, since one of the objects of this invention is to avoid concentration of the vegetable protein hydrolysates to the dry state as it appears to impair flavor and nutritive value and does not provide uniform compounding. Therefore the vegetable protein hydrolysates remain in solution prior to mixing, although for specific purposes and products the solutions are preferably concentrated from a 50 per cent solids content to a relatively high percentage of solids up to, for example, 96 per cent solids content or otherwise at the point where the solution may have to be kept warm to be sufficiently plastic for convenient and economical mixing with the soybeans.

The commercial solutions of vegetable protein hydrolysates, herein described, are obtained by conventional commercial processes, including acid hydrolysis, alkali hydrolysis or enzymatic hydrolysis of protein vegetables in the nature of wheat, corn, soybeans, sugar beet by-product, or any combination of these, and other like vegetable sources.

The preferred solution is one which retains substantially all of the amino acids obtained by hydrolyzing proteins of the character indicated. These amino acids may vary in number and in percentage of each dependent upon the basic raw material or materials used and the method of processing and hydrolyzing. However, as an illustrative example, a commercial solution of vegetable protein hydrolysates, used in the manner as described herein, contains most or all of the following named amino acids:

| | |
|---|---|
| Alanine | Lysine |
| Arginine | Methionine |
| Aspartic acid | Phenylalanine |
| Cystine | Proline |
| Glutamic acid | Serine |
| Glycine | Tyrosine |
| Histidine | Threonine |
| Hydroxyproline | Thyroxine |
| Isoleucine | Valine |
| Leucine | |

Some commercial solutions of vegetable protein hydrolysates may contain amino acids not specifically mentioned, as for example, in some instances the amino acid tryptophane may be added or otherwise, the solution may lack one or more of the amino acids for some specific purposes. Further, some amino acids may be present in varying quantities or percentages and one or more may be present in such small quantities as to constitute what are commonly known as trace materials. While some variations are permissible, due to the vegetable source or otherwise as heretofore indicated, it is preferred for most purposes, as herein indicated, that the glutamic acid constitute at least approximately 30 per cent by weight of the protein content of the solution.

The percentages of solids of vegetable protein hydrolysates compounded with soybeans is determined by the type of finished product desired, as indicated by examples illustrated herein. The general object is to introduce into the mixture sufficient of the solids of the vegetable protein hydrolysates to obtain the degree of modification of natural soya flavor, and the intensity of meaty or nutty flavor desired, and to provide a composite of soybeans and vegetable protein hydrolysates with the proportion of solids of hydrolysates discovered as most suitable for soya modification with respect to specific uses.

An illustrative method of obtaining a modified soybean flour may be illustrated by concentrating a commercially available hydrolyzed vegetable protein solution by a conventional vacuum concentrating process. This concentrate has a solids value of from 80% to 96% and preferably with retention of not less than 30% by weight of the protein content being monosodium glutamate or glutamic acid per 100 parts of protein solids, and while in a plastic state mixing from 1% to 20%, or more of the concentrate based on total solids weight, with soybeans in the whole, particle or grit form. Thereafter the mix is ground or milled by conventional apparatus to a dry powder state. Other methods of preparation of the modified soybean powder with solutions of hydrolyzed vegetable protein are described in my copending application Serial No. 129,502, filed November 25, 1949.

When the mixture is ground or milled, it is found that a thorough distribution of the concentrated hydrolysates of vegetable protein, into and over the soybean particles, is produced which in some manner alters, changes or modifies the bitter soya to a flavor having a pleasing taste and which can further be augmented and modified by subsequent addition of sweetening agents in the nature of sugar and the like. In general, it is found that with the hydrolysates in somewhat concentrated form the heat created in reducing the particles to powder size causes a gradual evaporation or loss of excessive moisture with the final product being in a dry fluffy state.

The modified cocoa preparation for admixture with the modified soyabean preparation is, in general, made up, by adding solutions of vegetable protein hydrolysates obtained from commercial processing of wheat, corn, soybeans, or sugar beets and the like, containing all the derived hydrolysate constituents, to cleaned cacao nibs preferably commercially processed as by roasting or the like. Thereafter, the nibs and hydrolysate solution are mixed by suitable agitation and this mixture is then ground or milled to fine granular or powder form in a conventional manner. While the solution concentration may be of any desired fluidity, for example, having 50 per cent moisture content or less, it is preferred to add from 8 per cent to 18 per cent hydrolysate solids based on total weight of combined solids. In the event of excessive moisture remaining in the milled mixture this moisture may be removed by vacuum dehydration or other suitable methods, in conventional manner before or after expressing cacao fat in a likewise conventional manner, if desired.

Illustratively, for example, an average composition, suitable for average taste characteristics may be prepared by mixing 90 lbs. of roasted cacao nibs with 20 lbs. hydrolysates containing 9 pounds solids. After mixing, the nibs are ground, by conventional apparatus, to powder form. Any excess moisture, if present, may be evacuated and the cacao treated by conventional expression of cacao fat before or after processing, to provide a chocolate material which is mixed with advantage with the modified soybean preparation, as herein described. Without expression of cacao fat, the chocolate is known as "bitter" which taste characteristic is reduced by the methods of treating cacao beans, in the manner as herein described. Otherwise the hydrolysate addition may be compounded, with cacao, before or after the expression of a portion of the cacao fat, as desirable.

A further composition may be formed by adding, for example, to cacao liquor or bitter chocolate a solution or fluid concentrate of vegetable protein hydrolysates in the approximate proportionate parts of 100 pounds cacao liquor constituting 33 per cent moisture and 67 per cent solids to 6 pounds hydrolysates solids in a 50 per cent solution more or less as desired. The liquor mix is milled or agitated as required, and subsequently added to a modified soybean preparation in the manner as herein described.

In general, solutions containing vegetable protein hydrolysates of ordinary commercial fluidity containing 50 per cent moisture more or less, can be mixed with commercially cleaned and roasted cacao nibs and ground to powder form, as a preferred method of manufacture, or mixed with "wet" cocoa, or sprayed onto dried and ground cocoa and mixed by mechanical agitation until a uniform dispersion is obtained. Vacuum dehydration or other suitable methods or processes of the compounded cocoa and hydrolyzed vegetable protein may be utilized to dry the product, if desired, prior to mixing with the modified soybean material.

Generally, for average taste, the preferred compounding ratios of cocoa to hydrolysates is discovered to be on the order of 12 to 14 pounds solids of vegetable protein hydrolysates to 100 pounds of the total weight of the cocoa including normal moisture as illustrated by the following examples:

*Example I.*—87 pounds cocoa, moisture 10%, solids 90%, 13 pounds solids of vegetable protein hydrolysates. The solids of vegetable protein hydrolysates constituting approximately 14% of the total combined solids weight.

The components of this composition are mechanically mixed with the hydrolysates contained in a 50 per cent solution. When the moisture content is undesirable, vacuum dehydration of the mix will reduce it to dry powder form or to a plastic state as desired without destroying the nutritive value of the protein hydrolysates. Other suitable methods of dehydration may be employed if preferred.

*Example II.*—100 pounds cacao liquor, moisture 33%, solids 67% 18.76 pounds of vegetable protein hydrolysates solution containing 50 per cent hydrolysate solids, i. e., 9.38 pounds of hydrolysates or approximately 14 per cent of the total combined weight of the solids is hydrolyzed protein.

Compounding of the above ingredients may be secured by mixing the cacao liquor with the hydrolysate solution in a stone roller mill or other conventional pulverizing machine and processed in the conventional manner for granulating or powdering the cacao. As herein indicated, this compound without an expression of cacao fat is of the bitter type and may be produced as a syrup by retention of moisture or in dry powder form upon dehydration, as desired.

Other methods of preparing the modified cocoa may be utilized as described in my co-pending application Serial No. 129,502, filed November 25, 1949.

With the modified soybean powder prepared as above described ready to mix hot and cold puddings and desserts and the like are formulated with or without mixtures of modified cocoa, in the manner as illustrated by the following examples.

I. Starch free pudding powder, with high protein value; for hot pudding:

| | Pounds |
|---|---|
| Soybean flour, modified as shown | 20–30 |
| To this add: | |
| Powdered sugar | 70–50 |
| Defatted milk solids | 10–20 |
| Vanillin, coumarin, or other flavorings | As desired |
| Jelling agent for hot pudding, e. g., pectin | As desired |

For this same pudding, but with chocolate flavor, add 6–10 pounds, as desired, of cocoa with flavor accentuated by vegetable protein hydrolysates, and reduce poundage of sugar and/or dried milk solids in proportions equal to the addition and in accordance with taste preference.

II. Starch free pudding and dessert powder with high protein value, for mixing with cold liquids:

| | Pounds |
|---|---|
| Soybean flour, modified as shown | 40–20 |
| To this add: | |
| Powdered sugar | 40–50 |
| Defatted milk solids | 20–30 |
| Vanillin, coumarin, or other flavoring | As desired |
| Cold water jelling agent | As desired |

In this formula the defatted milk solids may be replaced, if desired, with equivalent value of an appropriate type of cold water jelling agent and calcium reactant, in which case the protein value may be restored by proportionately increasing the modified soybean flour.

To convert this formula to a chocolate flavored pudding and dessert powder, add 6–10 pounds of cocoa accentuated by vegetable protein hydrolysates, and proportionately reduce the sugar and/or soybean flour as desired.

III. *Sample formula.*—Mixed base, containing modified soybean flour and accentuated cocoa, for mixing with standard materials to make a pudding, icing, fudge candy, etc., with high protein value:

| | Pounds |
|---|---|
| Soybeans modified by 10 lbs. hydrolyzed vegetable protein | 90 |
| Cocoa modified by 2.2 lbs. solids hydrolyzed vegetable protein | 15 |

The above examples are illustrative of dry mix packaged ingredients which are suitable for solubilizing with suitable agents as water, sugar, syrup and milk in proportions as desired to obtain a composition of the fluidity required for any particular use. For example, the compositions illustrated by I above, may be prepared by addition of a comestible solubilizing agent or agents in a highly heated condition and suitable agitation of the agent added and the composition slowly brought to boiling temperature with or without slight additional cooking, as desired. The fluidity is easily determined upon admixture and may be varied as desired to produce a foodstuff ranging from a thick pudding to a thin beverage.

In general, dry mixes may be prepared containing modified soybean flour and cocoa, preferably modified, and in any proportions desired which are mixed by suitable agitation and packaged for subsequent addition of sugar, salt and seasoning or flavoring agents and the like, sufficient to suit the taste in subsequent use. Otherwise, prepared syrups may be formulated from such mixtures by addition of water or other suitable solvents, with or without a sugar content and other seasoning, and packaged by conventional means, as a plastic or syrup foodstuff ready for use with or without further dilution. Preferably, for the compositions as herein described, the prepared mixes are illustrated as containing a major portion of modified soybean material and a minor portion of cocoa, with or without modification.

When the powdered products, prepared as herein described, are free from cornstarch, wheat flour, or cereal starches and used in the ready prepared form as herein descibed, cooking is not required. Particularly, for making puddings, icings, fillings, chocolate sauces, ice creams, fudge candies, beverages, and other foodstuffs, compositions in the nature disclosed by the illustrations, may be added to solvents or fluid solutions, with or without sugar and/or flavoring, as required, in practically any proportion of liquid to solids ranging from 5 per cent or less to 100 per cent or more to obtain a product of the fluidity desired. For example, the example first described, with an addition of 10 per cent or 10 pounds modified cocoa may be moistened with water, to the extent of providing a thick plastic mass which may be cut into individual pieces and served as fudge. Generally water, cold or hot, may be added, including pectins, gelatines and the like with or without additional flavoring to make puddings, fillings, icings, and beverages, in accordance with the particular fluidity desired in a resulting product. Obviously, the quantity of liquid present controls the thickness or thinness of the composite mass and may be added in the proportions desired to secure an end product suitable for a specified use. A ready to serve pudding, for example, may be made from the compounded mixture of Example I and II above described, consisting of 5 pounds of the compound and 10 pounds of water, more or less, in accordance with the thickness desired. Similarly, a beverage may be prepared by using liquid in excess to the basic mixture, as is the conventional practice, in making cocoa and chocolate.

When the compounded preparation is mixed in the manner as described in Example III, it is preferred that heated water or other heated fluid be added, with or without additional heating. and the addition of sugar or other flavoring to suit the taste. In this case, the heated fluid appears to provide a better taste to the resulting products, thereby indicating that a more suitable reaction or combining of the hydrolyzed vegetable protein with the soya and cocoa takes place. To either or any of the above type compositions, with or without cocoa or other agents in the nature of flavorings and the like, proteins, starchy or starchy-like foodstuff material and other food ingredients, as indicated, which may or may not require cooking or processing of a normal character, may be added in any proportion desired and as known in the culinary arts.

In utilizing prepared flour compositions of the character herein described, solubilizing or like agents in the nature of normal or skim milk may be used instead of water, if desired, and the sugar may be granulated or powdered. The sugar may be replaced in whole or in part by dextrose or corn syrup solids and the like. A flavoring material for the modified soya, with or without the cocoa addition, may be added in the nature of vanilla or vanillin, coumarin, or a combination of vanilla-like flavors including butterscotch, lemon, cherry, strawberry, and the like. Further, dried pectin or gelatine may be included in the soybean flour composition with or without the cocoa content, or these materials in solution may serve as moistening or suspending and jelling agents. Dried defatted milk may be compounded with the powder or added to a moistened or more liquified solution as it is being made up for consumption. In addition, fortification of the powder mix with vitamins and minerals of well known health and food value may be included either in the dry powder form or made up with the composition when utilized for consumption. Any and all of these ingredients may be present in any proportion desired, commensurate with customary and known correlated usages. Further, nuts and dehydrated fruits may be added to the compounded powders, if desired, either for immediate use or storage.

In the basic powder base preparation the soya bean material may be of the high fat type or the low fat type, and may, before treatment with the hydrolysates of vegetable proteins, be treated by a conventional chemical process or by heating, as in so-called de-bittering processes. Further, the hydrolyzed vegetable proteins may, in some cases, contain a reduced quantity of glutamic acid than heretofore indicated with somewhat lesser satisfactory change in taste characteristics of the soya flavor, although the glutamic acid alone has no particular value in affecting the bitter soya characteristic.

The advantages of utilizing soya flour with its inherent nutritive values and for retention of freshness, softness, and pliability has been recognized. Heretofore, however, the addition of soya has been limited to special application and then in small percentages, seemingly due to its heretofore unpleasant flavor characteristics. On the contrary, by the processing and methods as herein described, soya may be a major or basic constituent of prepared powder bases and in the event cocoa is used therewith, in the manner as described, the cocoa may be present in considerably reduced proportion due to its enrichment and accentuation of flavor. It is to be understood, that powder bases of the character herein described may include admixtures of soybean flour modified by hydrolysates of vegetable protein with one or more pectin or gelatine materials, fortification material, sweetening agents, and flavorings, as desired, compounded in ratios or proportions suitable for use in the culinary arts in addition to or where substituted, for example, for flours and starchy constituents.

Having thus described my invention in providing an improvement in ready to mix food powders containing soybean flour as a basic constituent by having its inherently disagreeable taste characteristics altered to an enjoyable and pleasing taste, I wish it to be understood that numerous modifications, in the nature as indicated, including addition products utilized in the preparation of foodstuffs will now be possible and fall within the terms of the claims.

I claim:

1. A ready to mix powder base foodstuff containing soya modified by hydrolyzed vegetable protein and cocoa, said foodstuff being characterized by a cocoa flavor substantially devoid of palatably objectionable soya flavor.

2. A product containing the constituents of claim 1, with the addition of a comestible solvent.

3. The foodstuff according to claim 1, wherein the soya component is present in a proportion exceeding the cocoa component.

4. A ready to mix powder base foodstuff containing soya modified by hydrolyzed vegetable protein, cocoa and a sweetening agent, said foodstuff being characterized by a cocoa flavor substantially devoid of palatably objectionable soya flavor.

5. A product containing the constituents of claim 3 with the addition of a comestible solvent.

6. The foodstuff according to claim 4, wherein the soya component is present in a proportion exceeding the cocoa component.

7. A ready to mix powder base foodstuff containing soya modified by hydrolyzed vegetable protein and cocoa modified by hydrolyzed vegetable protein, said foodstuff being characterized by a cocoa flavor substantially devoid of palatably objectionable soya flavor.

8. A product containing the constituents of claim 7 with the addition of a comestible solvent.

9. A product containing the constituents of claim 7 with the addition of a sweetening agent.

10. The foodstuff according to claim 7, wherein the soya component is present in a proportion exceeding the cocoa component.

11. A ready-to-mix powder base foodstuff containing soya modified by hydrolyzed vegetable protein, cocoa, and a jelling agent in dry form, said foodstuff being characterized by a cocoa flavor substantially devoid of palatably objectionable soya flavor.

12. A product containing the constituents of claim 11 with the addition of a comestible.

13. A soybean foodstuff in powder form comprising soybean flour and vegetable protein hydrolyzates in intimate association therewith and inseparably adhered thereto in a substantially uniformly finely divided homogeneous composite condition, and powdered cocoa, said foodstuff being characterized by a cocoa flavor substantially devoid of palatably objectionable soya flavor.

14. A soybean foodstuff in powder form comprising soybean flour and vegetable protein hydrolysates in intimate association therewith and inseparably adhered thereto in a substantially uniformly finely divided homogeneous composite condition, and powdered cocoa modified by vegetable protein hydrolysates conjointly ground with said cocoa, said foodstuff being characterized by a cocoa flavor substantially devoid of palatably objectionable soya flavor.

15. The foodstuff according to claim 11, wherein the soya component is present in a proportion exceeding the cocoa component.

16. The foodstuff according to claim 13, wherein the soya component is present in a proportion exceeding the cocoa component.

17. The foodstuff according to claim 14, wherein the soya component is present in a proportion exceeding the cocoa component.

ELMER K. PETTIBONE.

REFERENCES CITED

The following references are of record in the file of this patent:

UNITED STATES PATENTS

| Number | Name | Date |
| --- | --- | --- |
| 737,432 | Meinl | Aug. 25, 1903 |
| 1,015,891 | Ikeda | Jan. 30, 1912 |
| 1,854,355 | Wallerstein | Apr. 19, 1932 |
| 1,992,462 | Barnett | Feb. 26, 1935 |
| 2,414,299 | Hall | Jan. 14, 1947 |

FOREIGN PATENTS

| Number | Country | Date |
| --- | --- | --- |
| 407,866 | Great Britain | of 1934 |

OTHER REFERENCES

"Trade News," Food Mfg., April 1931, page 118.